US009676368B2

(12) United States Patent
Guo

(10) Patent No.: US 9,676,368 B2
(45) Date of Patent: *Jun. 13, 2017

(54) IN-VEHICLE PROTECTION SYSTEM USING MULTIPLE PROCESSING UNITS AND/OR USING COMMUNICATION MODULE TO SEND POSITIONING INFORMATION

(71) Applicant: MediaTek Singapore Pte. Ltd., Singapore (SG)

(72) Inventor: Liang Guo, Anhui (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 27 days.

This patent is subject to a terminal disclaimer.

(21) Appl. No.: 14/806,676

(22) Filed: Jul. 23, 2015

(65) Prior Publication Data

US 2015/0329078 A1 Nov. 19, 2015

Related U.S. Application Data

(63) Continuation-in-part of application No. 13/002,048, filed as application No. PCT/CN2010/079720 on Dec. 13, 2010, now Pat. No. 9,120,445.

(51) Int. Cl.
*B60R 25/00* (2013.01)
*B60R 25/102* (2013.01)
(Continued)

(52) U.S. Cl.
CPC ............ *B60R 25/00* (2013.01); *B60R 25/102* (2013.01); *B60R 25/33* (2013.01); *H04M 3/42348* (2013.01); *H04M 7/0078* (2013.01)

(58) Field of Classification Search
CPC . B60R 2325/205; B60R 25/00; B60R 25/102; B60R 25/33; B60R 25/104; H04M 3/42348; H04M 7/0078
See application file for complete search history.

(56) References Cited

U.S. PATENT DOCUMENTS 6,351,823 B1 2/2002 Mayer
6,765,500 B2 7/2004 Flick
(Continued)

FOREIGN PATENT DOCUMENTS

CN 1403319 A 3/2003
JP 2007125950 A 5/2007
JP 2008132920 A 6/2008

OTHER PUBLICATIONS

"International Search Report" mailed on Sep. 22, 2011 for International application No. PCT/CN2010/079720, International filing date:Dec. 13, 2010.

*Primary Examiner* — Jason Holloway
(74) *Attorney, Agent, or Firm* — Winston Hsu

(57) ABSTRACT

An in-vehicle protection system includes a signal input interface, a vehicle protection circuit, and a global navigation satellite system (GNSS) module. The signal input interface receives an indication signal indicative of a status of a vehicle. The vehicle protection circuit includes a first processing unit, a second processing unit, and a controller. The first and second processing units perform predetermined action in response to abnormality of a vehicle, and have different computing power. The controller outputs the indication signal to one of the first and second processing units according to an operational state of the in-vehicle protection system. The GNSS module obtains positioning information of the vehicle. After the second processing unit detects an abnormal status of the vehicle, the first processing unit sends at least one of the positioning information and vehicle alarm information indicative of the abnormal status through a communication network.

14 Claims, 4 Drawing Sheets

(51) Int. Cl.
*B60R 25/33* (2013.01)
*H04M 3/42* (2006.01)
*H04M 7/00* (2006.01)

(56) References Cited

U.S. PATENT DOCUMENTS

| | | | |
|---|---|---|---|
| 6,784,809 B2 | 8/2004 | Flick | |
| 6,892,119 B2 * | 5/2005 | Sakai | B60R 25/04 |
| | | | 701/36 |
| 7,138,914 B2 | 11/2006 | Culpepper | |
| 7,154,384 B2 * | 12/2006 | Nitou | B60R 25/042 |
| | | | 340/426.16 |
| 7,397,363 B2 * | 7/2008 | Joao | B60R 25/102 |
| | | | 307/10.2 |
| 7,550,869 B2 | 6/2009 | Higuchi | |
| 8,299,914 B2 | 10/2012 | Culpepper | |
| 9,120,445 B2 * | 9/2015 | Guo | B60R 25/00 |
| 2002/0082752 A1 | 6/2002 | Obradovich | |
| 2002/0154034 A1 | 10/2002 | Flick | |
| 2002/0163450 A1 | 11/2002 | Flick | |
| 2003/0034915 A1 | 2/2003 | Sasaki | |
| 2004/0263323 A1 * | 12/2004 | Seike | B60R 25/1004 |
| | | | 340/426.1 |
| 2007/0046004 A1 | 3/2007 | Komaki | |
| 2007/0279283 A1 | 12/2007 | Flick | |
| 2012/0150391 A1 * | 6/2012 | Guo | B60R 25/00 |
| | | | 701/45 |

\* cited by examiner

IN-VEHICLE PROTECTION SYSTEM USING MULTIPLE PROCESSING UNITS AND/OR USING COMMUNICATION MODULE TO SEND POSITIONING INFORMATION

CROSS REFERENCE TO RELATED APPLICATION

This is a continuation-in-part of U.S. application Ser. No. 13/002,048, filed on Dec. 30, 2010 and incorporated herein by reference.

BACKGROUND

The disclosed embodiments of the present invention relate to an in-vehicle protection scheme, and more particularly, to an in-vehicle protection system which uses multiple processing units for low power consumption and/or using a mobile phone module to send vehicle's positioning information for improved anti-theft performance.

With advance of the semiconductor technology, the in-vehicle control system becomes more powerful to support additional functions. For example, the in-vehicle control system may be designed to support navigation function by having a global navigation satellite system (GNSS) module incorporated therein. Besides, the vehicle may also have the in-vehicle control system capable of supporting a vehicle anti-theft function and/or a driving assistance function due to anti-theft consideration and/or driving safety consideration. However, such an implementation of the in-vehicle protection functions increases the overall production cost and power consumption of the in-vehicle control system, inevitably.

Thus, there is a need for a cost-effective and/or power-efficient in-vehicle control system which supports at least the vehicle anti-theft function and/or the driving assistance function.

SUMMARY

In accordance with exemplary embodiments of the present invention, an in-vehicle protection system which uses multiple processing units for low power consumption and/or using a communication module to send vehicle's positioning information for improved anti-theft performance are proposed.

According to a first aspect of the present invention, an exemplary in-vehicle protection system is disclosed. The exemplary in-vehicle protection system includes a signal input interface, a vehicle protection circuit, and a global navigation satellite system (GNSS) module. The signal input interface is arranged to receive at least an indication signal indicative of a status of a vehicle. The vehicle protection circuit includes a first processing unit, a second processing unit, and a controller. The first processing unit is arranged to perform predetermined action in response to abnormality of the vehicle. The second processing unit is arranged to perform predetermined action in response to abnormality of the vehicle, wherein computing power of the first processing unit is different from computing power of the second processing unit. The controller is coupled to the signal input interface, the first processing unit, and the second processing unit, and used for receiving the indication signal, outputting the received indication signal to the first processing unit for further processing when the in-vehicle protection system operates under a first operational state, and outputting the received indication signal to the second processing unit for further processing when the in-vehicle protection system operates under a second operational state different from the first operational state. The GNSS module is arranged to obtain positioning information of the vehicle. After the second processing unit detects an abnormal status of the vehicle, the first processing unit sends at least one of the positioning information and vehicle alarm information indicative of the abnormal status through a communication network.

According to a second aspect of the present invention, an exemplary in-vehicle protection system is disclosed. The exemplary in-vehicle protection system includes a signal input interface, a global navigation satellite system (GNSS) module, and a vehicle protection circuit. The signal input interface is arranged to receive at least an indication signal indicative of a status of a vehicle. The GNSS module is arranged to obtain positioning information of the vehicle. The vehicle protection circuit is coupled to the signal input interface, and arranged to perform predetermined action in response to abnormality of the vehicle. When the vehicle protection circuit detects an abnormal status of the vehicle by processing the received indication signal, the vehicle protection circuit sends at least one of the positioning information and vehicle alarm information indicative of the abnormal status through a communication network while an alarm message generated in response to the abnormal status is being played by an audio output device of the vehicle, wherein the alarm message is a driving assistance message or is generated due to temperature exceeding a predetermined threshold.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
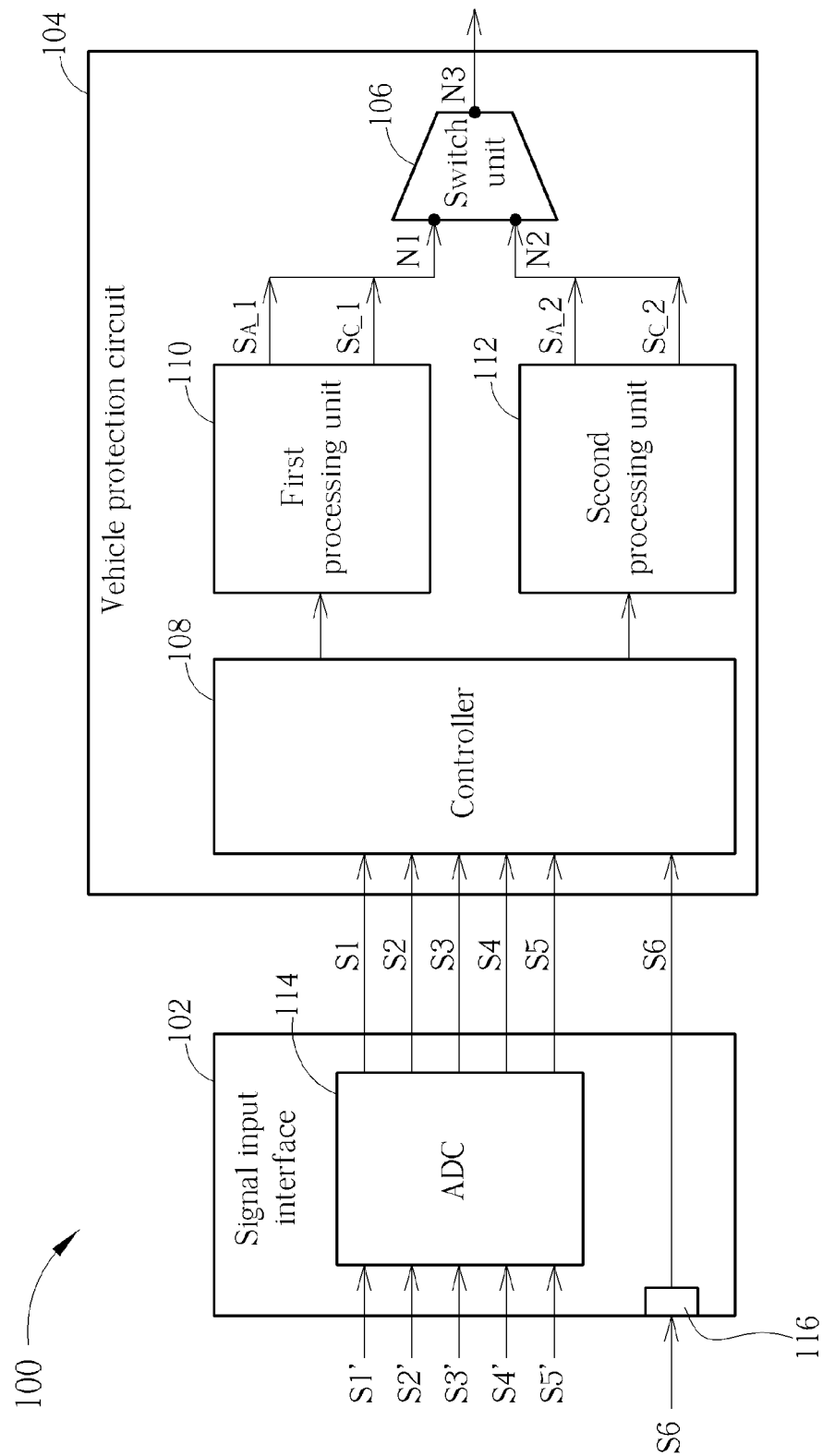
FIG. 1 is a diagram illustrating a first exemplary embodiment of an in-vehicle protection system according to the present invention.

FIG. 1 is a diagram illustrating a first exemplary embodiment of an in-vehicle protection system according to the present invention. The exemplary in-vehicle protection system 100 includes, but is not limited to, a signal input interface 102 and a vehicle protection circuit 104, where the vehicle protection circuit 104 includes a controller 108, a plurality of a processing units (e.g., a first processing unit 110 and a second processing unit 112), and an optional switch unit 106. The signal input interface 102 is arranged to receive at least one indication signal indicative of a status of a vehicle. By way of example, but not limitation, the signal input interface 102 is capable of receiving one of the indication signals S1-S6, where the indication signals S1-S6 may carry temperature information (e.g., engine temperature or ambient temperature), speed information (e.g., current moving speed of the vehicle), door information (e.g., locking/unlocking state of the vehicle door), engine information (e.g., operational state of the vehicle engine), and/or shaking information (e.g., shaking magnitude of the vehicle). More specifically, any of the indication signals S1-S6 is capable of indicating the occurrence of a specific event where an unauthenticated person (i.e., a vehicle thief) is stealing the vehicle or an authenticated person (i.e., the vehicle owner) is driving the vehicle in an unsafe manner. In this exemplary embodiment, the signal input interface 102 includes an analog-to-digital converter (ADC) 114 and a general purpose input/output (GPIO) port 116 which may have at least one GPIO pin. As shown in FIG. 1, the ADC 114 is arranged to generate the indication signal S1/S2/S3/S4/S5 by sampling an analog input S1'/S2'/S3'/S4'/S5' associated with the instant status of the vehicle. Regarding the GPIO port 116, it is used to receive the indication signal S6 (e.g., one bit used to indicate a particular status of the vehicle) and directly transmit the incoming indication signal S6 to the following controller 108.

Each of the first processing unit 110 and the second processing unit 112 is arranged to perform vehicle protection upon the vehicle. It should be noted that computing power of the first processing unit 110 is different from computing power of the second processing unit 112. This also implies that average power consumption of the first processing unit 110 is different from average power consumption of the second processing unit 112. By way of example, but not limitation, the first processing unit 110 may be an ARM (Advanced RISC Machine)-based processor, and the second processing unit 112 may be an 8032-based processor. Therefore, the computing power of the first processing unit 110 is higher than the computing power of the second processing unit 112 due to different processor architectures.

The controller 108 is coupled to the signal input interface 102, the first processing unit 110, and the second processing unit 112, and implemented for receiving an indication signal (e.g., S1, S2, S3, S4, S5, or S6), outputting the received indication signal to the first processing unit 110 for further processing when the in-vehicle protection system 100 operates under a first operational state, and outputting the received indication signal to the second processing unit 112 for further processing when the in-vehicle protection system 100 operates under a second operational state which is different from the first operational state. Thus, the current operational state of the in-vehicle protection system 100 decides which one of the first processing unit 110 and the second processing unit 112 should be selected and used for processing the received indication signal. In this exemplary embodiment, when the in-vehicle protection system 100 operates under the first operational state, the second processing unit 112 is disabled while the first processing unit 110 is enabled, and when the in-vehicle protection system 100 operates under the second operational state, the first processing unit 110 is disabled while the second processing unit 112 is enabled. In this way, the overall power consumption of the in-vehicle protection system 100 can be effectively reduced as the first processing unit 110 which is equipped with more powerful computing capability and accordingly has more power consumption is not always active.

By way of example, but not limitation, the in-vehicle protection system 100 is regarded as entering the aforementioned first operational state (e.g., a power-on mode) when an engine of the vehicle is started to be active, and the in-vehicle protection system 100 is regarded as entering the aforementioned second operational state (e.g., a standby mode) when an engine of the vehicle is turned off to be inactive. However, in other alternative designs, the first operational state and/or the second operational state may have definitions different from that mentioned above.

As mentioned above, each of the first processing unit 110 and the second processing unit 112 is capable of performing the vehicle protection function. In one exemplary embodiment, each of the first processing unit 110 and the second processing unit 112 is arranged to generate an alarm message $S_{A\_}1/S_{A\_}2$ or a self-protection control signal $S_{C\_}1/S_{C\_}2$ in response to an abnormal status of the vehicle detected by processing the received indication signal. For example, the alarm message $S_{A\_}1/S_{A\_}2$ may be a voice message to be played by an audio output device such as a speaker, or may be a notification message used to notify the in-vehicle control system's main micro controller unit (MCU) of the detected abnormal status of the vehicle. Regarding the self-protection control signal $S_{C\_}1/S_{C\_}2$, it may be a hardware control signal that directly controls the operation of the vehicle, or may be a triggering signal that invokes a particular program executed for eliminating factor(s) which may make the vehicle operate abnormally.

Regarding the optional switch unit 106, it has a first input node N1 coupled to the first processing unit 110, a second input node N2 coupled to the second processing unit 112, and an output node N3. The switch unit 106 has the output node N3 coupled to the first input node N1 when the in-vehicle protection system 100 operates under the first operational state, and has the output node N3 coupled to the second input node N2 when the in-vehicle protection system 100 operates under the second operational state. To put it another way, the switch unit 106 outputs an output of the first processing unit 110 (which is either the alarm message $S_A\_1$ or the self-protection control signal $S_C\_1$) when the in-vehicle protection system 100 operates under the first operational state, and outputs an output of the second processing unit 112 (which is either the alarm message $S_A\_2$ or the self-protection control signal $S_C\_2$) when the in-vehicle protection system 100 operates under the second operational state. In a case where the second processing unit 112 is disabled and the first processing unit 110 is enabled when the in-vehicle protection system 100 operates under the first operational state, and the first processing unit 110 is disabled and the second processing unit is enabled 112 when the in-vehicle protection system 100 operates under the second operational state, the optional switch unit 106 may be omitted due to the fact that only one of the first processing unit 110 and the second processing unit 112 is allowed to be active.

To reduce the production cost, the signal input interface 102, the first processing unit 110, the second processing unit 112 and the controller 108 may be disposed in a single chip.

As the in-vehicle navigation system becomes more and more popular, the exemplary in-vehicle protection system 100 of the present invention may be integrated with the in-vehicle navigation system for further reducing the production cost. For example, the aforementioned single chip is a system-on-a-chip (SOC) of the in-vehicle navigation system.

For better understanding of technical features of the present invention, an example of using the in-vehicle navigation system in the in-vehicle control system is discussed as follows.

Figure 2:
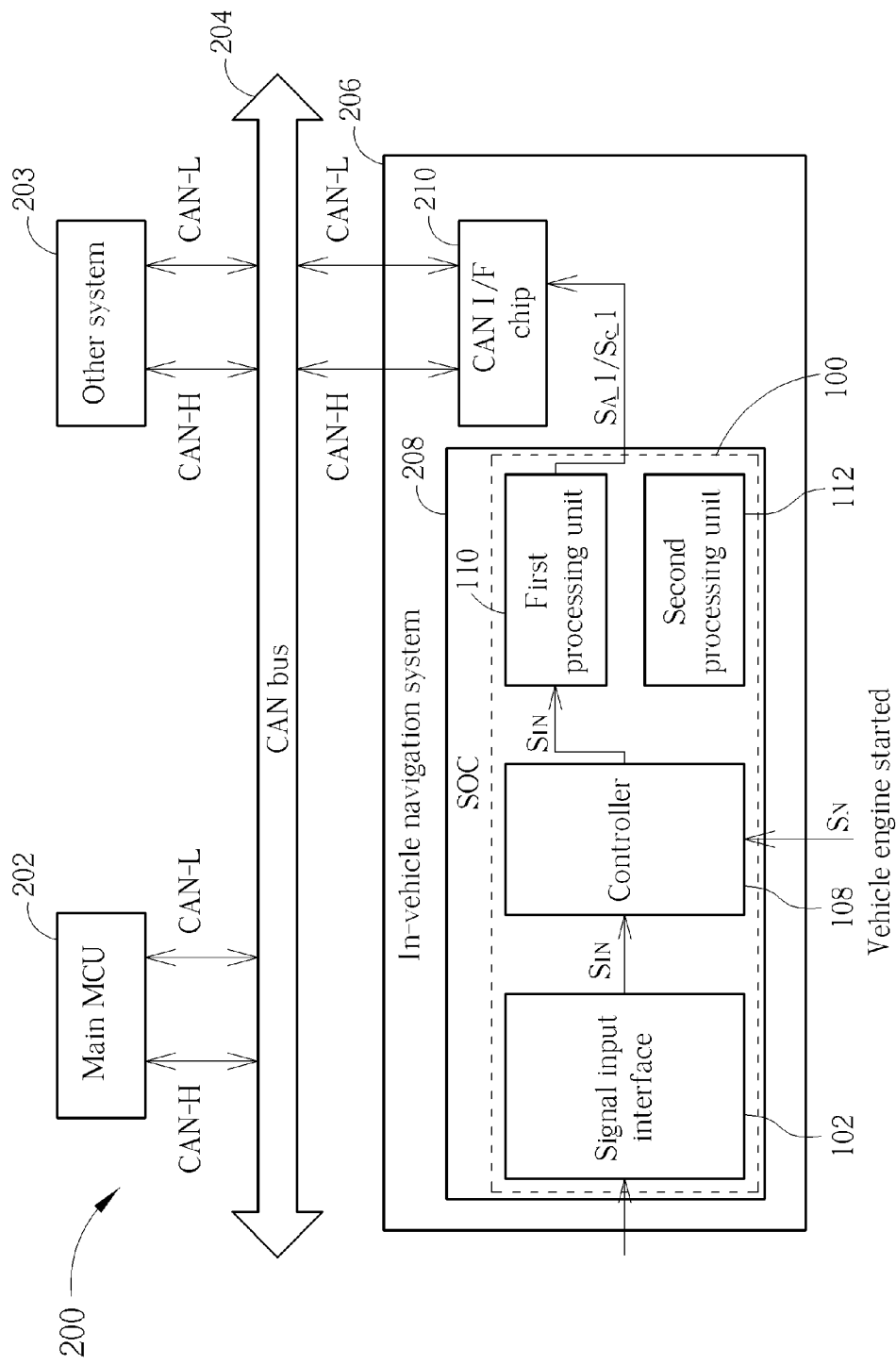
FIG. 2 is a diagram illustrating an in-vehicle navigation system implemented in an in-vehicle control system under a first operational scenario.

Please refer to FIG. 1 in conjunction with FIG. 2. FIG. 2 is a diagram illustrating an in-vehicle navigation system implemented in an in-vehicle control system under a first operational scenario. The in-vehicle control system 200 includes, but is not limited to, a main MCU 202, a controller area network (CAN) bus 204, and an in-vehicle navigation system 206. The main MCU 202 communicates with the in-vehicle navigation system 206 through the CAN bus 204. More specifically, each of the main MCU 202 and the in-vehicle navigation system 206 is coupled to the CAN bus 204 by signal lines CAN-H and CAN-L, where signal lines CAN-H and CAN-L are used for transmitting a differential signal pair. In addition to the main MCU 202 and the in-vehicle navigation system 206, the in-vehicle control system 200 may include other system 203 coupled to the CAN bus 204. As a person skilled in the pertinent art can readily understand function and operation of the CAN network bus 204 and the signal lines CAN-H and CAN-L, further description is omitted here for brevity.

The in-vehicle protection system 100 is integrated with the in-vehicle navigation system 206. More specifically, components of the in-vehicle protection system 100 are disposed in an SOC 208 of the in-vehicle navigation system 206. In addition to the SOC 208, the in-vehicle navigation system 206 has a CAN interface (CAN I/F) chip 210 used for transmitting data to and receiving data from the CAN bus 204. It should be noted that only the components pertinent to the present invention are shown in FIG. 2 for clarity and simplicity. For example, the in-vehicle navigation system 206 or the SOC 208 may contain additional circuit components to realize the desired navigation functionality.

When an engine of the vehicle is started to be active, the controller 108 receives a notification $S_N$ generated from a detector (not shown) and controls the in-vehicle protection system 100 to enter the first operational state in response to the notification $S_N$. In this first operational scenario, the first processing unit 110 is enabled and the second processing unit 112 is disabled. Thus, the first processing unit 110 is allowed to determine an output of the in-vehicle protection system 100. That is, an output of the first processing unit 110 serves as the output of the in-vehicle protection system 100, and is transmitted to the CAN bus 204 through the CAN I/F chip 210. It should be noted that, even though the optional switch unit 106 is employed in the in-vehicle protection system 100, the switch unit 106 would also receive the same notification $S_N$ sent to the controller 108 and then make the first input node N1 coupled to the output node N3 in response to the notification $S_N$.

After the engine of the vehicle is started and becomes active, the signal input interface 102 outputs an indication signal $S_{IN}$ (e.g., one of the indication signals S1-S6 as shown in FIG. 1) according to an incoming indication signal, and the controller 108 stores the received indication signal $S_{IN}$ and transmits the received indication signal $S_{IN}$ to the first processing unit 110. Upon detecting the abnormal status of the vehicle by processing the indication signal $S_{IN}$, the first processing unit 110 generates an alarm message $S_{A\_1}$ or a self-protection control signal $S_{C\_1}$. For example, suppose that the indication signal $S_{IN}$ is indicative of the current moving speed of the vehicle. When the first processing unit 110 identifies that the current moving speed of the vehicle exceeds a predetermined threshold, the vehicle is regarded as having an abnormal status. Therefore, the first processing unit 110 may generate the alarm message $S_{A\_1}$, such as a voice message, to notify the driver that the current moving speed of the vehicle is too high. Alternatively, the first processing unit 110 may generate the self-protection control signal $S_{C\_1}$ to invoke a particular program executed for limiting the acceleration of the vehicle. However, the above-mentioned driving assistance function performed by the first processing unit 110 for improving the driving safety is for illustrative purposes only. That is, the first processing unit 110 may be properly configured to support other driving assistance functions as desired.

Figure 3:
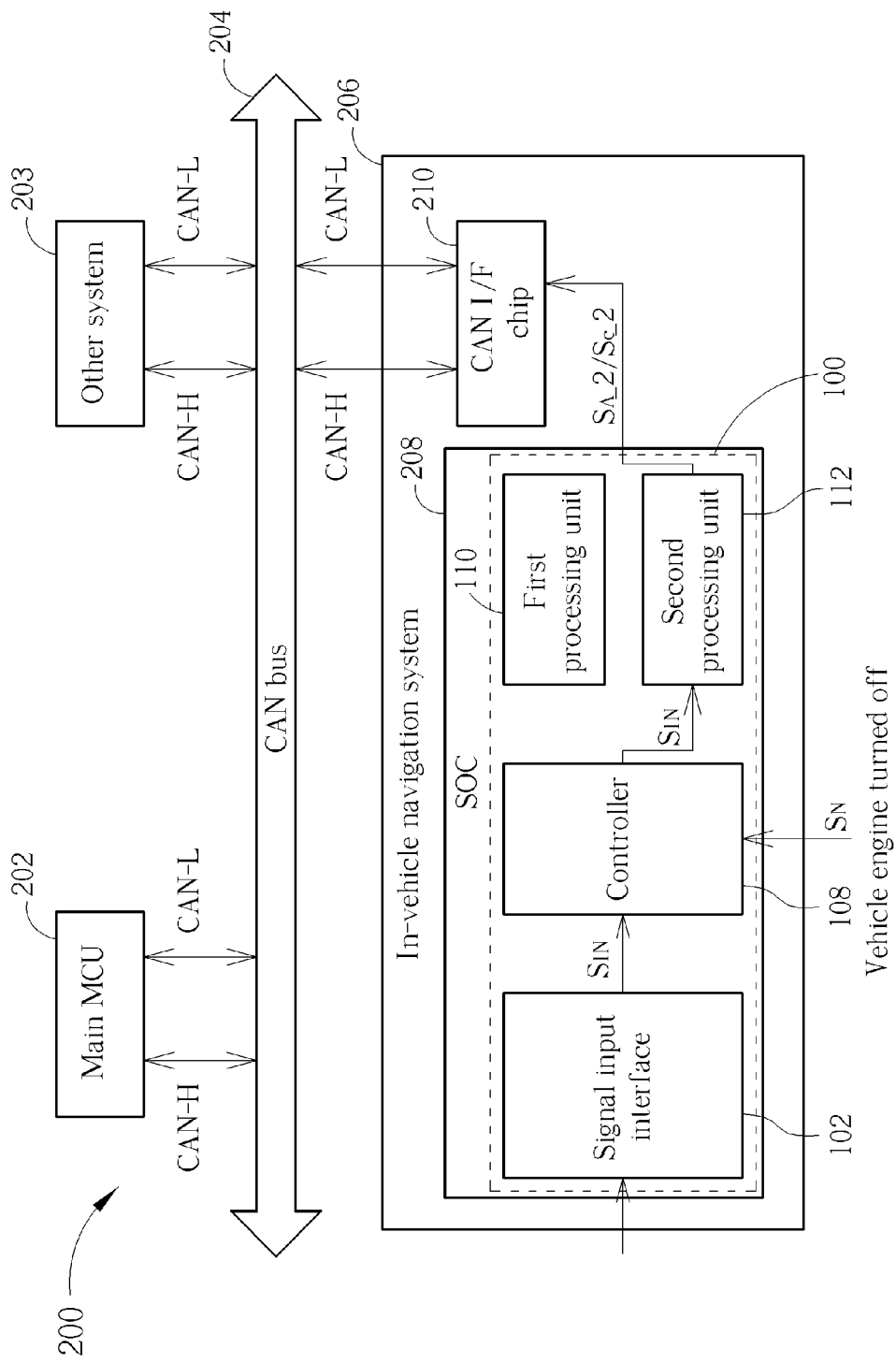
FIG. 3 is a diagram illustrating an in-vehicle navigation system implemented in an in-vehicle control system under a second operational scenario.

Please refer to FIG. 1 in conjunction with FIG. 3. FIG. 3 is a diagram illustrating an in-vehicle navigation system implemented in an in-vehicle control system under a second operational scenario. The major difference between the exemplary embodiments shown in FIG. 2 and FIG. 3 is that the controller 108 receives the notification $S_N$ generated from a detector (not shown) and controls the in-vehicle protection system 100 to enter the second operational state in response to the notification $S_N$ when the engine of the vehicle is turned off to be inactive. In this second operational scenario, the first processing unit 110 is disabled and the second processing unit 112 is enabled. Thus, the second processing unit 112 is allowed to determine an output of the in-vehicle protection system 100. In other words, an output of the second processing unit 112 serves as the output of the in-vehicle protection system 100, and is transmitted to the CAN bus 204 through the CAN I/F chip 210. It should be noted that, even though the optional switch unit 106 is employed in the in-vehicle protection system 100, the switch unit 106 would also receive the same notification $S_N$ sent to the controller 108 and then make the second input node N2 coupled to the output node N3 in response to the notification $S_N$.

By way of example, but not limitation, the main MCU 202 may also be notified by the same notification $S_N$ when the engine of the vehicle is turned off. Therefore, the main MCU 202 may control a video output device (not shown) of the in-vehicle control system 200 to display a graphical user interface (GUI) such that the driver can determine whether the vehicle should enter the vehicle protection (e.g., self-protection and/or anti-theft) mode and determine which vehicle protection function(s) should be enabled under the vehicle protection mode through the displayed GUI. In a case where the driver does not enable the vehicle protection mode after the engine is turned off and becomes inactive, all components within the in-vehicle control system 200 are powered off. In another case where the driver enables the vehicle protection mode after the engine is turned off and becomes inactive, all components within the SOC 208, except the signal input interface 102, the controller 108, and the second processing unit 112, are powered off; additionally, the main MCU 202 and other system 203 may also be powered off, depending upon actual requirement/consideration.

Under the second operational scenario where the vehicle enters the vehicle protection (anti-theft) mode after the engine of the vehicle is turned off, the signal input interface 102 outputs an indication signal $S_{IN}$ (e.g., one of the indication signals S1-S6 as shown in FIG. 1) according to an incoming indication signal, the controller 108 stores the received indication signal $S_{IN}$ and transmits the received indication signal $S_{IN}$ to the second processing unit 112. Upon detecting the abnormal status of the vehicle by processing the indication signal $S_{IN}$, the second processing unit 112 generates an alarm message $S_{A\_}2$ or a self-protection control signal $S_{C\_}2$.

For example, the indication signal $S_{IN}$ may be indicative of the current ambient temperature of the vehicle. When the second processing unit 112 detects that the current ambient temperature of the vehicle exceeds a predetermined threshold, implying that the vehicle itself or something nearby is on fire, the vehicle is regarded as having an abnormal status. Thus, the second processing unit 112 may generate the alarm message $S_{A\_}2$ which acts as a fire alarm when played by an audio output device of the vehicle. The indication signal $S_{IN}$ may be indicative of the current status of the door lock, the steering wheel, or the automatic/manual transmission. When the second processing unit 112 detects that the current status of the door lock, the steering wheel, or the automatic/manual transmission is changed when the engine is inactive, implying that an unauthenticated person (i.e., a vehicle thief) is trying to use the protected vehicle, the vehicle is regarded as having an abnormal status. Therefore, the second processing unit 112 may generate the alarm message $S_{A\_}2$ which acts as an alarm siren when played by an audio output device of the vehicle. Moreover, when a vehicle theft event is identified by the second processing unit 112, the second processing unit 112 may also generate the self-protection control signal $S_{C\_}2$ to invoke a particular program executed for disabling/locking all or part of systems/components related to starting the engine of the vehicle and displaying a GUI for receiving a password used to enable/unlock any disabled/locked system/component related to starting the engine of the vehicle. That is, after the vehicle theft event is identified by the second processing unit 112, the engine of the vehicle is protected from being started unless the correct password is entered and verified.

In one alternative design, the second processing unit 112 shown in FIG. 3 may notify the main MCU 202 through the CAN bus 204 when detecting the abnormal status of the vehicle under a condition where the engine of the vehicle stays in an inactive state or has an abnormal transition from the inactive state to an active state. For example, the second processing unit 112 may generate the alarm message $S_{A\_}2$ to inform the main MCU 202 of the detected vehicle's abnormal status. Therefore, when notified by the second processing unit 112, the main MCU 202 takes action to deal with the vehicle's abnormal status.

In another alternative design, the second processing unit 112 shown in FIG. 3 may wake up the standby components of the in-vehicle navigation system 206 or in-vehicle control system 200 when detecting the abnormal status of the vehicle under a condition where the engine of the vehicle stays in an inactive state or has an abnormal transition from the inactive state to an active state. For example, the second processing unit 112 may generate the alarm message $S_{A\_}2$ to inform the main MCU 202 of the detected vehicle's abnormal status. Therefore, when notified by the second processing unit 112, the main MCU 202 wakes up standby components of the in-vehicle navigation system 206 or in-vehicle control system 200. As a result, the in-vehicle protection system 100 would be switched from the second operational state to the first operational state, and the first processing circuit 110 is therefore enabled for taking action to deal with the vehicle's abnormal status.

Figure 4:
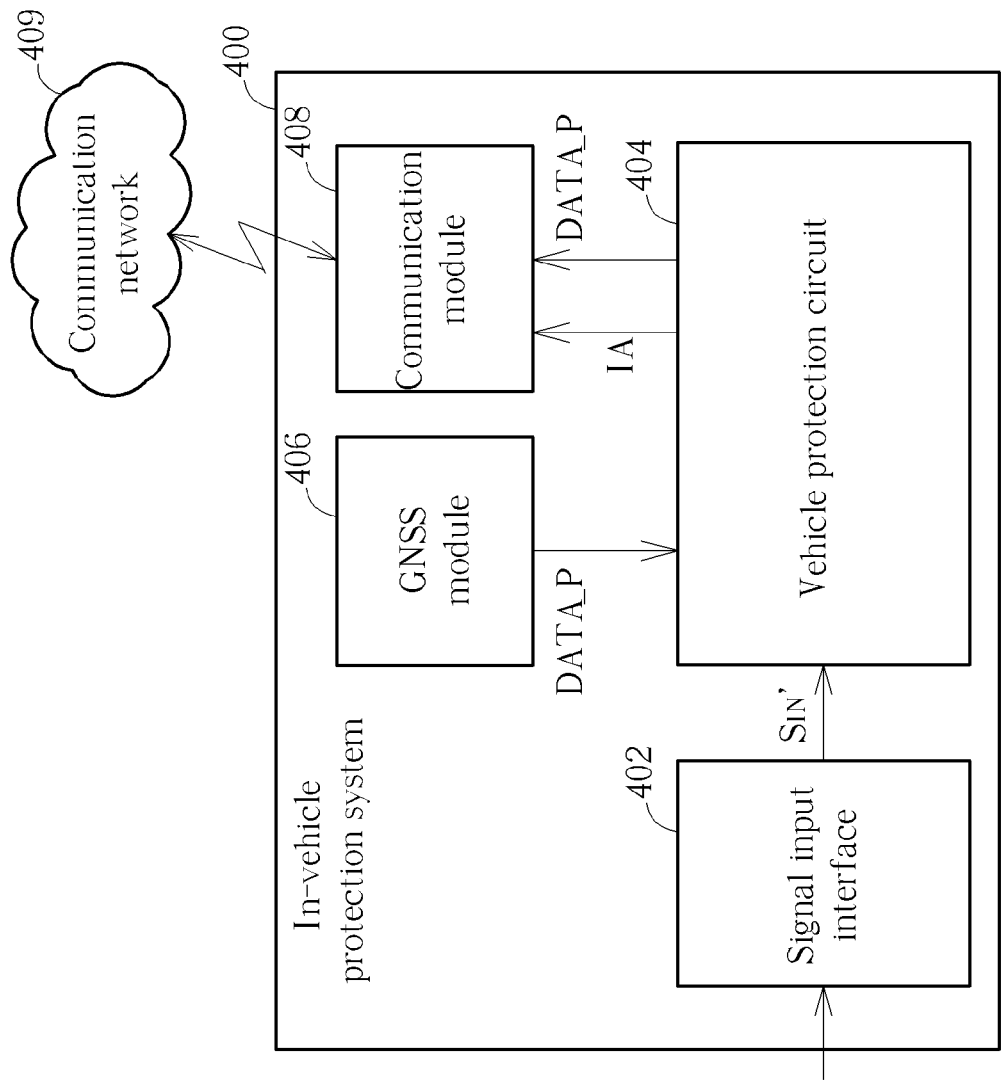
FIG. 4 is a diagram illustrating a second exemplary embodiment of an in-vehicle protection system according to the present invention.

The in-vehicle protection system of the present invention may have additional circuit component(s) included therein to offer advanced protection for the vehicle. Please refer to FIG. 4, which is a diagram illustrating a second exemplary embodiment of an in-vehicle protection system according to the present invention. The exemplary in-vehicle protection system 400 includes, but is not limited to, a signal input interface 402, a vehicle protection circuit 404, a global navigation satellite system (GNSS) module 406, and a communication module 408.

For clarity and simplicity, the following assumes that the communication module 408 may be implemented using a mobile phone module. Hence, the terms "communication module" and "mobile phone module" may be interchangeable hereinafter. However, this is for illustrative purposes only, and is not meant to be a limitation of the present invention. In practice, the communication module 408 may be arranged to communicate with a communication network 409 complying with one of a global system for mobile communications (GSM) standard, a Wireless Fidelity (WiFi) standard, a Bluetooth (BT) standard, a Near Field Communication (NFC) standard, a Bluetooth Low Energy (BLE) standard, a Long-Term Evolution (LTE) standard, and a Long-Term Evolution-Advanced (LTE-Advanced) standard.

The signal input interface 402 is arranged to output at least one indication signal $S_{IN}'$ indicative of a status of the vehicle according to an incoming indication signal. For example, the signal input interface 402 may be realized using the signal input interface 102 shown in FIG. 1, and the indication signal $S_{IN}'$ may be one of the indication signals S1-S6 shown in FIG. 1. Thus, the indication signal $S_{IN}'$ may carry temperature information (e.g., engine temperature or ambient temperature), speed information (e.g., current moving speed of the vehicle), door information (e.g., locking/unlocking state of the vehicle door), engine information (e.g., operational state of the vehicle engine), or shaking information (e.g., shaking magnitude of the vehicle). The vehicle protection circuit 404 is coupled to the signal input interface 402 and arranged to perform vehicle protection upon the vehicle according to the received indication signal $S_{IN}'$. The GNSS module 406 is arranged to obtain positioning information DATA_P of the vehicle. For example, the GNSS module 406 may be a global positioning system (GPS) receiver capable of deriving vehicle's positioning information DATA_P from signals received from satellites. The mobile phone module 408 is arranged to communicate with a communication network 409. For example, the mobile phone module 408 may be a cellular phone apparatus complying with the global system for mobile communications (GSM) standard. When the vehicle protection circuit 404 detects an abnormal status of the vehicle by processing the received indication signal $S_{IN}'$, the vehicle protection circuit 404 performs vehicle protection upon the vehicle by controlling the mobile phone module 408 to send the positioning information DATA_P through one or more predetermined phone numbers. For example, the abnormal status of the vehicle is detected by the vehicle protection circuit 404 under a condition where the engine of the vehicle stays in an inactive state or has an abnormal transition from the inactive state to an active state. In a case where the mobile phone module 408 is a GSM cellular phone apparatus, the mobile phone module 408 is capable of sending a short message, having at least the positioning information DATA_P embedded therein, to one or more predetermined phone numbers. For example, a predetermined phone number may be a phone number of the owner of the vehicle or a phone number of a police station. In this way, the instant location of the stolen vehicle can be identified by means of the positioning information DATA_P which may be updated periodically by the GNSS module 406.

Alternatively, in addition to the positioning information DATA_P mentioned above, the mobile phone module 408 may be controlled by the vehicle protection circuit 404 to send vehicle alarm information IA indicative of an abnormal status of the vehicle through one or more predetermined phone numbers when the vehicle protection circuit 404 detects the abnormal status of the vehicle by processing the received indication signal $S_{IN}'$. For example, while an alarm message (e.g., a voice message, a fire alarm, or an alarm siren) is being played by an audio output device (e.g., a speaker) of the vehicle for notifying the vehicle's abnormal status, the mobile phone module 408 may send the positioning information DATA_P and/or the vehicle alarm information IA to the same predetermined phone number(s) or different predetermined phone number(s). When the vehicle is in the far distance from an authenticated person (i.e., the vehicle owner) or the playback duration of the alarm message is too short, the alarm message played by the vehicle's audio output device may fail to bring the vehicle's abnormal status to the authenticated person's notice. However, with the help of the mobile phone module 408, the vehicle alarm information IA may be transmitted through a phone number of the authenticated person to thereby notify the authenticated person of the abnormal status of the vehicle in time. Briefly summarized, when the vehicle protection circuit 404 detects an abnormal status of the vehicle by processing the received indication signal $S_{IN}'$, the mobile phone module 408 sends at least one of the positioning information DATA_P and the vehicle alarm information IA through at least one predetermined phone number, thereby improving the anti-theft function greatly.

To reduce the production cost, at least the signal input interface 402 and the vehicle protection circuit 404 may be disposed in a single chip. In addition, as the in-vehicle navigation system becomes more and more popular, the signal input interface 402 and the vehicle protection circuit 404 may be integrated with the in-vehicle navigation system for further reducing the production cost. For example, the signal input interface 402 and the vehicle protection circuit 404 are integrated within an SOC of the in-vehicle navigation system.

Moreover, the vehicle protection circuit 404 may have the circuit architecture of the vehicle protection circuit 104 in FIG. 1 implemented therein. Thus, after the second processing unit 112 detects the abnormal status of the vehicle, the first processing unit 110 is enabled such the second processing unit 112 hands over the control to the first processing unit 110. Next, the first processing unit 110 performs vehicle protection upon the vehicle by controlling the mobile phone module 408 to send the positioning information DATA_P through the predetermined phone number. In addition, as the vehicle protection circuit 404 may have the circuit architecture of the vehicle protection circuit 104 in FIG. 1 implemented therein, the vehicle protection circuit 404 may operate according to the exemplary configurations shown in FIG. 2 and FIG. 3. Further description is omitted here for brevity.

Please note that the term "in-vehicle" mentioned above is not meant to limit the scope of the present invention to car applications. That is, any transportation which uses a protection system having the proposed architecture should be regarded as having the proposed in-vehicle protection system implemented therein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An in-vehicle protection system, comprising:
a signal input interface, arranged to receive at least an indication signal indicative of a status of a vehicle;
a vehicle protection circuit, comprising:
a first processing unit, arranged to perform predetermined action in response to abnormality of the vehicle;
a second processing unit, arranged to perform predetermined action in response to abnormality of the vehicle, wherein computing power of the first processing unit is different from computing power of the second processing unit; and
a controller, coupled to the signal input interface, the first processing unit, and the second processing unit, for receiving the indication signal, outputting the received indication signal to the first processing unit for further processing when the in-vehicle protection system operates under a first operational state, and outputting the received indication signal to the second processing unit for further processing when the in-vehicle protection system operates under a second operational state different from the first operational state; and
a global navigation satellite system (GNSS) module, arranged to obtain positioning information of the vehicle;
wherein after the second processing unit detects an abnormal status of the vehicle, the first processing unit sends at least one of the positioning information and vehicle alarm information indicative of the abnormal status through a communication network.

2. The in-vehicle protection system of claim 1, wherein when the in-vehicle protection system operates under the first operational state, the second processing unit is disabled while the first processing unit is enabled; and when the in-vehicle protection system operates under the second operational state, the first processing unit is disabled while the second processing unit is enabled.

3. The in-vehicle protection system of claim 1, wherein the in-vehicle protection system enters the first operational state when an engine of the vehicle is started to be active.

4. The in-vehicle protection system of claim 3, wherein the computing power of the first processing unit is higher than the computing power of the second processing unit.

5. The in-vehicle protection system of claim 1, wherein the in-vehicle protection system enters the second operational state when an engine of the vehicle is turned off to be inactive.

6. The in-vehicle protection system of claim 5, wherein the computing power of the first processing unit is higher than the computing power of the second processing unit.

7. The in-vehicle protection system of claim 1, wherein when the second processing unit detects the abnormal status of the vehicle by processing the indication signal under a condition where the engine of the vehicle stays in an inactive state or has an abnormal transition from the inactive state to an active state, the in-vehicle protection system is switched from the second operational state to the first operational state such that the first processing unit is enabled to deal with the abnormal status of the vehicle.

8. The in-vehicle protection system of claim 1, further comprising:

a communication module, arranged to communicate with the communication network;

wherein the first processing unit controls the communication module to send at least one of the positioning information and the vehicle alarm information through the communication network.

9. The in-vehicle protection system of claim 1, wherein the communication network complies with one of a global system for mobile communications (GSM) standard, a Wireless Fidelity (WiFi) standard, a Bluetooth (BT) standard, a Near Field Communication (NFC) standard, a Bluetooth Low Energy (BLE) standard, a Long-Term Evolution (LTE) standard, and a Long-Term Evolution-Advanced (LTE-Advanced) standard.

10. The in-vehicle protection system of claim 1, wherein the signal input interface and the vehicle protection circuit are disposed in a system-on-a-chip (SOC) of an in-vehicle navigation system.

11. The in-vehicle protection system of claim 1, wherein each of the first processing unit and the second processing unit is arranged to generate an alarm message or a self-protection control signal in response to the abnormal status of the vehicle detected by processing the received indication signal.

12. The in-vehicle protection system of claim 1, wherein the vehicle protection circuit further comprises:

a switch unit, having a first input node coupled to the first processing unit, a second input node coupled to the second processing unit, and a output node;

wherein the switch unit has the output node coupled to the first input node when the in-vehicle protection system operates under the first operational state, and has the output node coupled to the second input node when the in-vehicle protection system operates under the second operational state.

13. The in-vehicle protection system of claim 1, wherein the signal input interface comprises an analog-to-digital converter (ADC) arranged to generate the indication signal by sampling an analog input associated with the status of the vehicle.

14. The in-vehicle protection system of claim 1, wherein the signal input interface comprises a general purpose input/output (GPIO) port arranged to receive the indication signal and directly transmit the indication signal to the controller.

* * * * *